Aug. 10, 1954 H. N. WROE 2,686,228

TELEPHONE SIGNALING ARRANGEMENT

Filed Feb. 27 1952 3 Sheets-Sheet 1

INVENTOR
H. N. WROE
BY Philip M. Bolton
ATTORNEY

Aug. 10, 1954 H. N. WROE 2,686,228

TELEPHONE SIGNALING ARRANGEMENT

Filed Feb. 27 1952 3 Sheets-Sheet 2

INVENTOR
H.N. WROE
BY
Philip M. Bolton
ATTORNEY

TELEPHONE SIGNALING ARRANGEMENT

Filed Feb. 27 1952 3 Sheets-Sheet 3

INVENTOR
H.N. WROE
BY
Philip M. Bolton
ATTORNEY

Patented Aug. 10, 1954 2,686,228

UNITED STATES PATENT OFFICE 2,686,228

TELEPHONE SIGNALING ARRANGEMENT

Henry Newman Wroe, Dublin, Ireland, assignor to International Standard Electric Corporation, New York, N. Y., a corporation of Delaware Application February 27, 1952, Serial No. 273,652

Claims priority, application Ireland March 3, 1951

10 Claims. (Cl. 179—84)

This invention relates to the use of alternating currents for signalling.

According to the invention, there is provided an alternating current signalling system for signalling over a transmission line from a station A to a station B in which the said station B comprises a source of alternating signalling current, an alternating current receiver, and means for feeding signalling current from said source to said station A, and in which the said station A comprises a signal transmitter for modulating signalling current received from said source at said station B for signalling to said station B.

Also according to the invention, there is provided an alternating current signalling system for signalling over a transmission line from a station A to a station B in which the said station B comprises an oscillator connected to said transmission line so that said line is included in the positive feedback path of the said oscillator, and in which the said station A comprises means for modifying the impedance of said feedback path for signalling purposes.

The invention has particular application to telephone subscriber dialling systems where it is not possible to provide a complete metallic circuit between a subscriber's station and a central exchange, so that signalling by means of direct current becomes impracticable, and it is not convenient to provide frequency generators at the subscriber's staion. Such telephone systems are frequently encountered in power generation and distribution systems where telephone lines serving high-tension power sub-stations have frequently to be protected against the effects of serious rises of earth potential at the station under certain fault conditions on the power lines.

Where the outlying telephone sub-station employs magneto calling, a highly insulated isolating transformer inserted in the telephone line can be employed. If automatic working of the telephone system is to be employed a difficulty arises in that, in the normal course, a direct-current path for dialling is required, and this cannot be provided unless the isolating transformer is removed, and other and less satisfactory methods of protection are employed. The retention of the transformer means normally the adoption of A. C. signalling which involves the use of intricate signalling circuits and of special power supplies and standby batteries at the sub-station, as well as at the telephone exchange. Not only is this expensive but it involves specialised maintenance for the telephone equipment at the sub-station.

Great advantages would accrue if the equipment required at the latter point could be reduced to a few simple passive items and if all the active equipment could be simplified and concentrated at the telephone exchange where both suitable power supplies and skilled maintenance are available as a matter of course.

The present invention provides a means of dialling in to a central exchange from such an outlying sub-station by the use of more or less standard sub-station equipment and a centrally-located source of alternating signalling current, provided the line is not unduly long; and while the invention is particularly applicable to telephone lines in these circumstances, it is clearly not limited to such arrangements but is generally applicable where signalling for instance via an isolating transformer is necessary.

The invention is also useful for signalling in mines or other locations where explosive atmospheres present signalling difficulties on account of sparking.

The invention will now be described with reference to the accompanying drawing illustrating several embodiments. In the drawing:

Fig. 4 shows a more complicated embodiment based on the use of separate speech and signal channels provided by high and low-pass filters; while

Figures 1, 2:
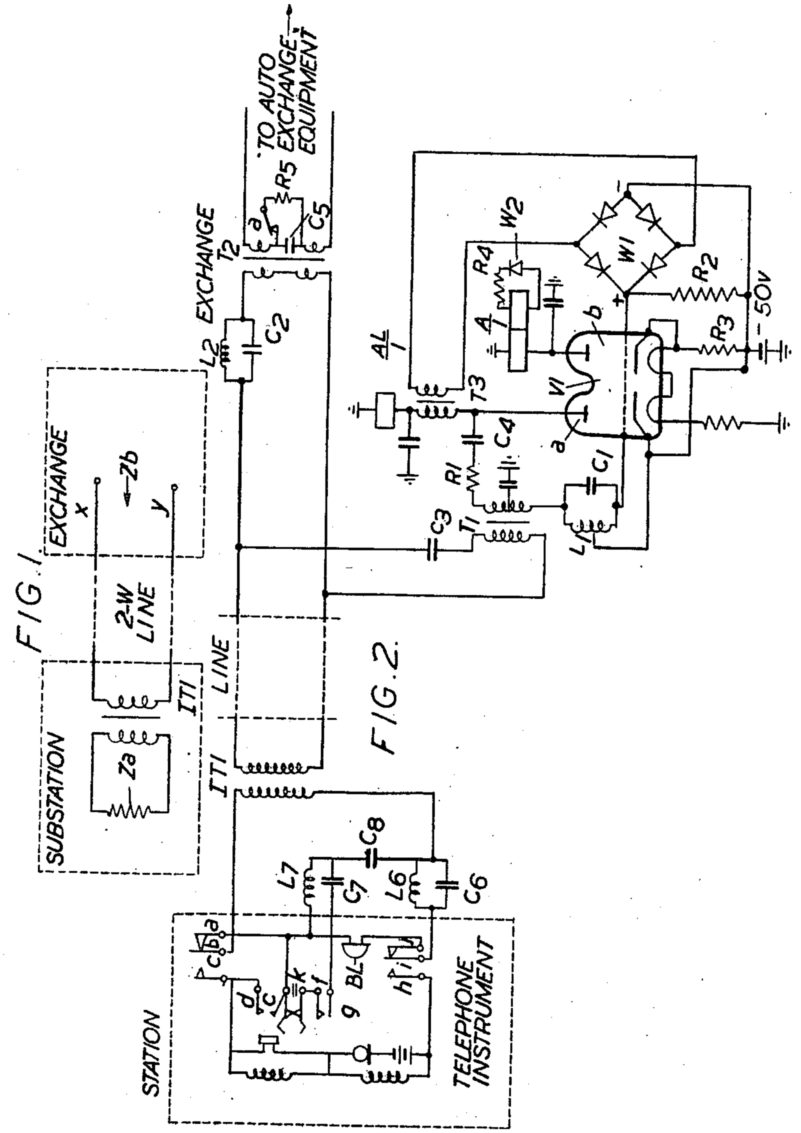
Fig. 1 is of an explanatory nature.
Figs. 2 and 3 are different embodiments of a simple system according to the invention.

Referring now to Fig. 1, IT1 represents an isolating transformer at the substation end of a 2-wire line, and $Za$ represents an impedance connected across the line on the isolated side of IT1 at the substation. At the exchange, the impedance $Zb$ indicated at the terminals $x$, $y$, is the resulting impedance "seen" at these terminals, $Za$ and $Zb$ both being measured at a particular frequency to be known throughout as the "signalling frequency."

It is well-known from transmission line theory that the impedance presented at the terminals at one end of a line depends not only on the impedance joining the other ends of the line and the frequency of measurement, but also on the total resistance, inductance, capacitance and leakance of the line. The four latter parameters are generally expressed in terms of their value per unit length (e. g. miles) of the line (when they become known as the "primary constants" of the line) so that the length of the line also enters into the relations found for the line.

It is then observed that, for a given line, the influence of an impedance such as $Za$ on the value $Zb$ measured at the other end becomes less and less the longer the line, that is to say, the impedance measured at terminals $x$, $y$, at a particular frequency, $f$, becomes less and less sensitive to changes in impedances taking place at the other end of the line, in $Za$. However, provided the line is not too long, or, alternatively, provided the measuring (or signalling) frequency is made sufficiently low, a change of impedance at the substation brought about by a dialling or key-sending action there can be transmitted satisfactorily to the exchange as a change of line impedance, and there used to modify the performance of the measuring frequency generator, signalling being thereby effected.

A simple system based on the above principles is illustrated in Fig. 2 which shows a local battery substation equipped with an automatic dial, and line terminating equipment at an exchange up to and including a signal repeating relay ("A" relay).

The exchange equipment consists mainly of a Hartley oscillator for a suitable voice frequency, comprised by the left-hand portion ($a$) of the double triode V1 and its associated circuit elements, including the line impedance as seen from T1, together with a detector stage formed from the right-hand portion ($b$) of V1 and having the relay A in its anode circuit. This equipment is designed to work from the 50 volt exchange battery, earthed at the positive terminal; the anodes of the two triode portions of V1 are thus normally "earthy."

The oscillator consists, in addition to the triode V1-$a$, of a positive feed-back path coupled to the anode via condenser C4. This feed-back path comprises the series connection of transformer T1, shunt-resonant circuit L1—C1, and a series resistor R1, and is coupled to the grid-cathode circuit of V1-$a$ by the lower tapped portion of L1. The cathode is connected to the negative terminal of the 50 volt battery for correct D. C. conditions, and the anode load for the oscillator proper is the upper portion of the tapped primary of transformer T1. The secondary of T1 is connected via C3 to the line, which thereby contributes to the feed-back effect.

The oscillator output is developed across the primary of transformer T3, connected to the anode of V1-$a$, the secondary of this transformer being loaded by a bridge rectifier W1, loaded with R2. The whole of the output through T3 is thus rectified in W1 and applied as positive bias to the grid of V1-$b$ acting as a rectifier, neutralising a negative bias developed in cathode and heater resistor R3 and applied via W1. The anode of V1-$b$ is connected to earth via one winding of a relay A, the other winding of relay A being closed in a circuit comprising resistor R4 and rectifier W2.

This latter arrangement, which will be referred to later, provides some degree of pulse shaping for the repeated signals.

In the absence of oscillations in V1-$a$ (under conditions shortly to be discussed), the negative bias developed in R3 (by heater current) is sufficient to bias V1-$b$ to cut-off, and A is consequently not operated, while when the oscillator is active, the positive bias obtained by rectification of the oscillator output overrides the negative bias, and permits the relay to operate.

At the exchange, the line to the sub-station terminates on one winding of a transformer T2, the other winding of which is connected to the standard subscriber's termination (the usual A, B and C relays, not shown in this figure), and which also is in two halves coupled through a condenser C5. Across the condenser is a contact $a$ of the relay A, in series with a resistor R5, which serves to repeat the incoming signals to the automatic exchange equipment. The outgoing portion of the line and the subscriber's termination are included in the feed-back path of the oscillator, and the shunting effect of the impedance of the automatic exchange equipment is minimised by the insertion in the line to T2 of a shunt resonant circuit L2—C2, which is tuned to the signalling frequency.

When the impedance presented by the line at T1 is low, the oscillator will function; whereas, when the impedance is high, the oscillations will cease. Relay A will therefore be operated or released in accordance with the impedance of the subscriber's line and the D. C. loop to the subscriber's exchange termination will be correspondingly opened or closed.

At the sub-station, the line terminates in isolating transformer IT1, the secondary of which is connected to the subscriber's instrument via a parallel resonant circuit L6—C6 which is tuned to the signalling frequency and serves a similar purpose in regard to the exchange equipment. Connected directly across the line on the secondary side of IT1 is a series resonant circuit L7—C7, also tuned to the signalling frequency, connection being normally made via the contacts $a$, $b$, of the receiver (or hand-set) switch-hook.

When the line is idle, the series circuit presents a low impedance at the preferred frequency of oscillation of the oscillator, which therefore oscillates, operating relay A and opening the line to the automatic equipment. When the circuit is seized for an outgoing call from the substation, the series resonant circuit is broken, and the line impedance goes high at the signalling frequency, and the oscillations accordingly cease, allowing relay A to be released and the loop to the exchange automatic-equipment to be closed, as for a standard, incoming C. B. exchange call.

The lifting of the receiver or hand-set from its hook connects the speaking equipment across the line via contacts $b$, $c$, and $h$, $i$, and also connects into circuit a mechanical impulse generator such as a telephone dial having off-normal contacts $d$, $e$, and $f$, $g$, and interrupter contacts $k$. When the dial is rotated off-normal, closure of contacts $f$, and $g$ causes condenser C7 to be connected in parallel with L7 via contacts $k$ and the closure of contacts $d$ and $e$ causes the series circuit consisting of C8 and the L7—C7 combination to be inserted across the line. Since L7—C7 is resonant at the signal frequency, the impedance thus shunted across the line remains high. At each break of the dial impulsing contacts $k$ as the dial returns to normal C7 is disconnected, leaving L7 in series with C8. The line is accordingly bridged by the low impedance of the series circuit, and $Z_b$ (as seen from the exchange) falls to a low value, causing oscillations to be produced at the exchange with each break of the springs and the operation of relay A. The dial impulses are thus repeated to the exchange equipment by modulation of the line impedance at the sub-station.

The rejector circuits L2—C2, L6—C6 previously referred to, also confer a contain degree of "voice-immunity" on the operations of relay A. In this connection, however, it is to be observed that this form of signalling has an intrinsic advantage over the usual forms of V. F. signalling in that the signal level available for application to the detector stage and operation of relay A is far greater than in such V. F. systems, considering comparable points in the respective circuits, an advantage of 20 db being possible. Thus, the ratio signal/voice is much greater than that normally obtained, and voice operation can easily be prevented.

The R4—W2 shunt circuit applied to the second winding of relay A may now be explained. The build-up and decay times of the oscillations arising from the dial breaks and makes are not uniform, so that a certain amount of distortion of the dial impulsing ratio is caused in the repeated signals from relay A. The effect of the rectifier W2 in the shunt circuit of the second winding of this relay is to differentiate its operate and release lags, thereby making it possible to destroy very largely the original timing to the pulses.

On a call incoming to the sub-station, the normal 17 C./S. ringing current from the automatic equipment passes via the exchange transformer T2 to line (L2—C2 being at low impedance) and rings the bell B1 at the sub-station via the back-contacts *a, b, j, i,* of the receiver rest. This current is prevented from affecting the oscillator by the series condenser C3, or of a tuned circuit (not shown) in the leads to the oscillator.

When the call is answered, the bell is disconnected by the operation of the receiver rest, and the impedance offered to the line by the sub-station termination is increased, as described above, causing the oscillations to cease and relay A to release. This in turn causes the exchange equipment to be looped and the ringing to be tripped.

Many alternatives are possible in the substation equipment for varying the termination impedance by the dial, one being to use the dial off-normal springs to short-circuit condenser C8, the dial interrupter springs causing the opening of the short-circuit. This enables C7 to be eliminated.

Also, although a dial has been referred to exclusively as the mechanical impulse generator, any other form of impulse generator such as a keysender arranged to produce a train of impulses in response to the depression of a key may be used.

None of the system components need be of high quality. The distance over which the system will function depends upon the signalling frequency employed and the sensitivity of relay A. With a normal type of telephone relay and a signalling frequency of 3.1 kc. successful operation over 1.75 miles of 10 lb. telephone cable has been obtained. As the frequency is reduced the length of line can be increased very materially. The signalling current level at the Exchange terminal of the line is of the order of 0 db referred to 1 mw. into 500 ohms. There is no difficulty in obtaining the correct impulse ratio at the A-relay contacts.

Figure 3:
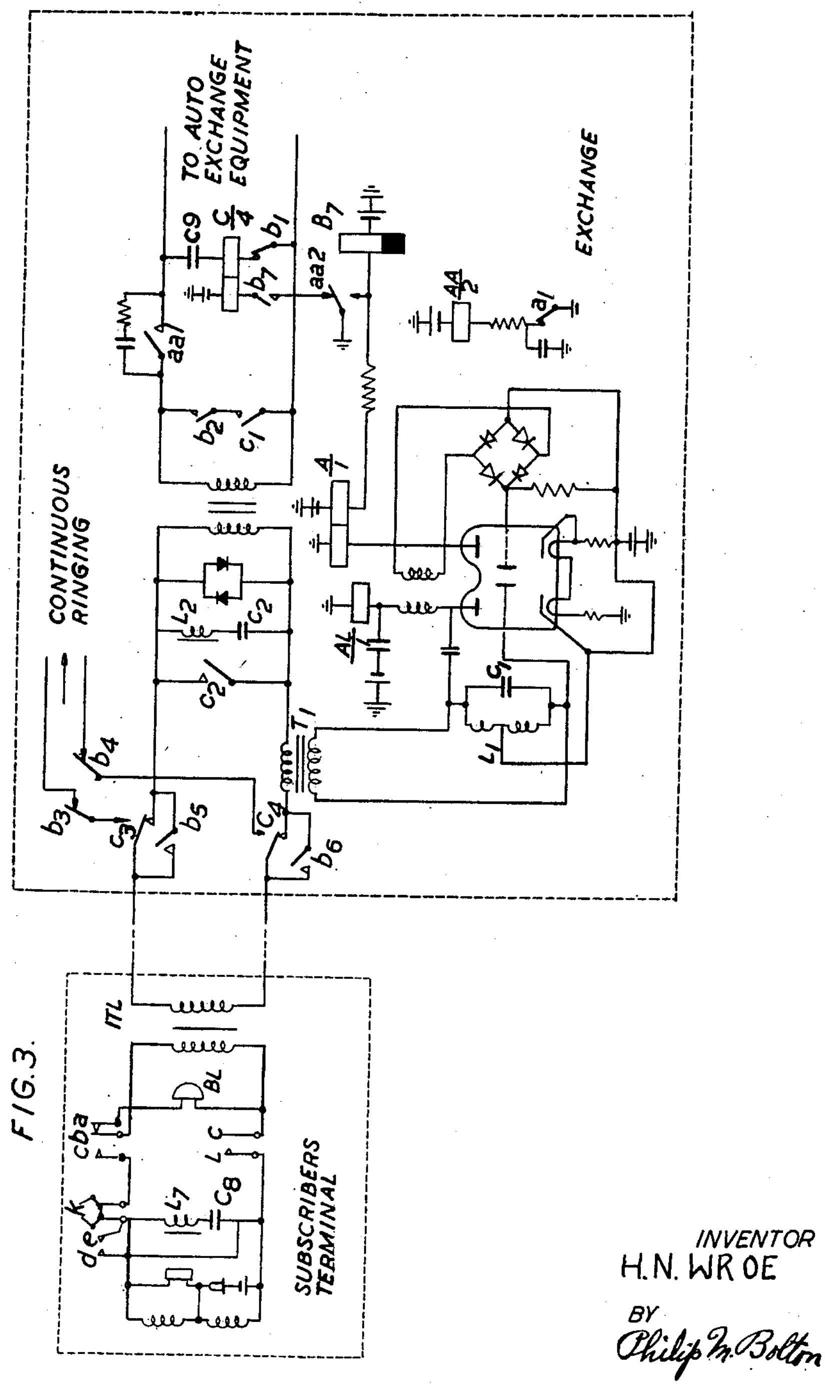

Fig. 3 shows a preferred embodiment in rather fuller detail.

The system of Fig. 2 was intended for an operating frequency in the region of 2000 C./S., which rather restricts the length of line that can be used. The system of Fig. 3 is intended to operate at a much lower frequency, e. g. 200 C./S., so as to cater for the longest subscribers' lines. The use of a low frequency also means that the dangers of interference to other circuits is much reduced, so that a higher level of signalling current to line can be tolerated. Advantage has been taken of this to invert the conditions for starting and stopping the oscillator which obtained in the previous system, thereby securing further simplifications in circuit design which eliminate the need for high grade components, and enable the circuit to be used with the standard dial, with consequent improvement in the impulsing conditions. The signalling conditions required from the subscribers' apparatus are those which normally obtain in straightforward D. C. impulsing.

Referring new to Fig. 3, it will be observed that more of the exchange automatic equipment has been shown, the usual A, B and C relays being included (in this instance, the usual "A" relay is shown as an "AA" relay being a relief relay on the V. F. signalling equipment "A" relay).

The oscillator and detector are substantially the same as in Fig. 2, but the coupling to the line is now taken in parallel with the shunt resonant circuit L1—C1 in the feed-back path instead of in series, and is applied to the line in series, at T1, via various relay contacts, to be herein described. When the line is idle, the impedance presented to the oscillator across the feed-back path is high and oscillations are produced, relay A being operated on its left-hand winding. This causes relay AA to be released and the loop to the automatic equipment to be opened (at *aa1*).

At the substation, following the isolating transformer IT1, the bell BL is looped across the line via back contacts *a, b* of the switch-hook, the front contacts *c* and *h* (of the pair *i, h*) connecting in the telephone handset and dial when the handset is lifted from its rest.

Bridged across the line via the interrupter springs *k* of the dial is a series resonant circuit L7—C8 (using the notation of Fig. 2) resonant at the signal frequency, which is short-circuited by the off-normal springs of the dial during dialling to provide the best possible line conditions. At the exchange, an analogous series circuit L2—C2 is bridged across the line, which also is short-circuited during dialling by the exchange equipment C relay, in a manner to be described. This circuit also acts to give the best possible line conditions for signalling.

The low impedance connected across the oscillatory circuit of the oscillator by means of L7—C8 and L2—C2 is almost completely resistive.

When the subscriber's handset is raised for an outgoing call, the bell is disconnected and a low impedance is presented to the line by L7—C8 via contacts *k, b, c,* and *h, i,* and also by L2—C2, and applied to the oscillatory circuit via T1. The oscillator, therefore, ceases to oscillate, relay A is released, and auxiliary relay AA operates, via *a1*.

Relay AA at its contact *aa2* operates slow relay B, and at *aa1* loops the line to the automatic equipment.

B operating, (i) at *b1* disconnects the right-hand winding of relay C, which is sensitive to ringing current on the line from the automatic equipment, but (ii) prepares relay C for operation at *b7* by earth over the back contact of *aa2* during line breaks; (iii) at $b2$, prepares a short-circuit to the automatic equipment loop in series with front contact $c1$; (iv) at $b3$ and $b4$, disconnects continuous ringing which would otherwise be applied by operations of $c3$ and $c4$, while (v) $b5$ and $b6$ maintain the subscriber's loop during dialling when C is operated.

During dialling, each break of the dial impulse contacts $k$ cause the line impedance to assume a high value so that oscillations occur, and relay A is energised, releasing AA, which disconnects the forward loop, thus repeating the dial break into the automatic equipment loop. When the impulse springs remake, the line impedance falls, oscillations cease, and relay A releases and re-operates relay AA to reconnect the forward loop to the automatic equipment. Thus the dial impulses are repeated to the automatic exchange equipment.

The further functions of the B and C relays are well known from normal automatic exchange practice, but will be briefly described for the sake of completeness.

C is a slightly slow relay which operates on the first release of AA with the return to normal of the dial, and thereafter remains operated until the end of the digit, for which it tests. Contacts $c1$ and $b2$ up together loop the line to the exchange automatic equipment, which is interrupted by the breaks of $aa1$ repeating the dial impulses. Contacts $c2$ loops the exchange end of the line, as previously explained, and contacts $c3$ and $c4$ are ineffective in this context. The second, right-hand, winding of relay A is provided for pulse-shaping, as in Fig. 2, but in this instance operates by a pulse of current from relay AA on each re-operation by the dial.

C is also a "ring-out" relay, which responds to ringing applied from the automatic exchange equipment on selection of the subscriber's line shown, by means of its right-hand winding via the condenser C9, and so applies ringing current via contacts $c3$, $c4$, up, and $b3$, $b4$, normal, in strict conformity with the operations of relay C.

The relay AL, shown in both Figs. 2 and 3, is an alarm relay to give a station alarm in the event of complete failure of the oscillator.

When the line is in use for speaking, the oscillator is quiescent owing to the low impedance shunts provided by L7—C8, and L2—C2 at 200 C./S. but these shunts substantially inoperative in the normal speech band above about 300–400 C./S.

Advantageous features found for this particular system in a working model include the following:

(1) Functions entirely from a 50 v. battery.

(2) Requires non but low-grade components.

(3) Operates satisfactorily for line loop resistances in excess of 600 ohms for any battery voltage between the standard limits of 46 v.–52 v.

(4) Signal level to line +8 dbm. to +10 dbm.

(5) No distortion of speech.

(6) Immune to speech operation.

Figure 4:
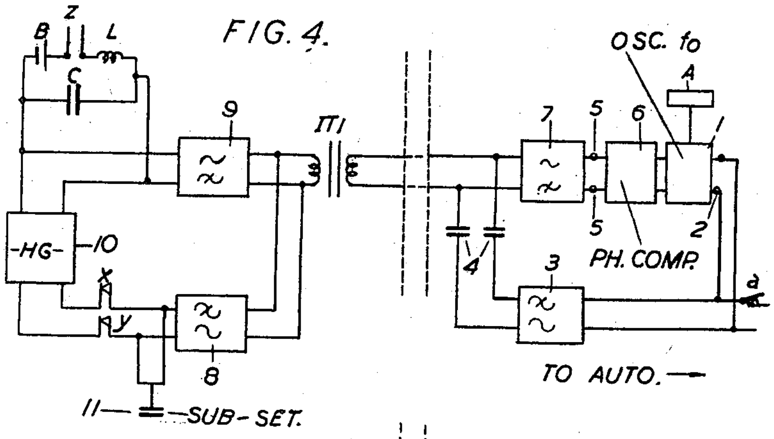
Figure 5:
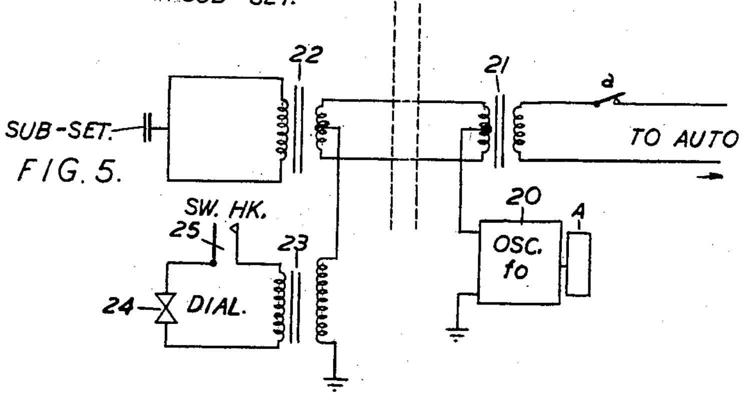
Fig. 5 shows a different separate-channel embodiment, using a phantom circuit. Finally.

Figures 4 and 5 illustrate two further embodiments based on the slightly broader interpretation of the term "impedance" which springs from alternating current network theory (but is not confined thereto).

In this conception of impedance, it is defined as the ratio E/I, where E and I may both be complex, E being the voltage applied to any pair of terminals of a network, and I is the resulting current, whether or not there already exists within the network considered one or more E. M. F.'s. If, for example, we obtain at a pair of terminals of a network having no internal E. M. F's. a ratio E/I for the current I resulting from the application of an E. M. F. (E), we say that the impedance of the network at these terminals is E/I. If, now, another E. M. F. is applied, internally or externally, to the network, this ratio E/I will alter, so that the appearance or presence of this second E. M. F. can be considered as having changed the impedance of the network as seen from the terminals considered.

In Figs. 4 and 5, a separate channel for the return of the signalling current to the oscillator is provided on the telephone line to the substation by well-known methods, in Fig. 4 by the division of the speech path into high- and low-frequency channels, and in Fig. 5 by the provision of a phantom circuit. The remainder of the exchange and substation equipment will be substantially as for either of the previous embodiments, such modifications as are required being indicated in the descriptions which follow.

Referring now to Fig. 4, which is largely in block form, the oscillator 1 at the exchange is provided as a tuned amplifier for the signalling frequency $fo$ (preferably in the region of 2000 C/S.), the output terminals 2 of which are fed to the subscriber's line via a low-pass filter 3 and condensers 4. The filter will have a nominal cut-off frequency of about 3000 C./S., and is connected also to the exchange automatic equipment via relay contact $a$. The input terminals 5 of the oscillator or amplifier are also connected to the line, but in this case via a phase-compensating network 6 and a high-pass filter 7 which is complementary to the low-pass filter, so that there is no direct transfer of energy from output to input of the oscillator-amplifier at the frequency $fo$.

At the subscriber's station, following the isolating transformer IT1, the line again branches to similar complementary low- and high-pass filters 8 and 9 respectively, which are connected together on their further sides by a harmonic generator or frequency multiplier 10. Connected in parallel with the line between 9 and 10 is an auxiliary L—C circuit which includes a local battery B and a contact $z$, and connected in parallel between 8 and 10 is the sub-set equipment 11. Contacts $x$ and $y$ in series between 8 and 10 serve to break the circuit during dialling.

The harmonic generator is designed to produce preferably the third harmonic of $fo$, i. e. 6000 C./S. in this instance, and the L—C circuit is tuned similarly to $3fo$.

Assuming that the oscillator-amplifier is already oscillating, output at 2000 C./S. is fed to line via the low-pass filter at the exchange, filtered out by the low-pass filter at the substation, and fed to the input of the harmonic generator ($x$ and $y$ being closed). The 6000 C./S. therein produced is fed to line via the high-pass filter 9 and returned to the exchange where it is selected (from the outgoing 2000 C./S.) by the high-pass filter 7 and fed to the input of the amplifier. Here, in spite of its elevated frequency, it serves to maintain the oscillations, when once started.

However, with this frequency-multiplication arrangement, the oscillator is not self-starting on mere closure of the feed-back loop including the harmonic generator. Hence, the L—C circuit is provided, tuned to $3fo$, to give a surge to the circuit of a damped train of waves of frequency $3fo$, whenever it is required to start the oscillations, e. g. on replacing the hand-set or during dialling, and hence the contacts z (which may be duplicated, if necessary), are provided associated both with the receiver-rest and the dial.

In accordance with the explanatory notes at the commencement of this section, the appearance at the sub-station terminals of the third harmonic constitutes the introduction into the system of a new E. M. F., so that the impedance of the line ratio E/I as seen through the H. P. filter 7 from the terminals 5 at the exchange will be seen to have been modified.

The main requirement of this system is that the $3fo$ component should arrive back at the oscillator-amplifier in correct phase and with sufficient amplitude to effect a synchronisation. The former requires the introduction of the adjustable phase-compensating network 6 before the amplifier, while the latter implies sufficient gain in the early stages of the oscillator-amplifier to cater for weak signals returned from the substation.

This latter point, i. e. the strength of the returned signal and the gain that can be used, is the determining factor in the length of line that can be accommodated with this system.

The substation equipment, also, is more complicated and costly, and in general would require power supplies. The local battery referred to for generating the 6000 C./S. starting surges could well be the speaking battery.

Fig. 5, also in block form, shows the alternative arrangement using a phantom circuit. The oscillator 20 at E is grounded at one terminal of its feed-back path, while the other terminal is connected to the phantom circuit at the centre-point of the line side of the exchange transformer 21; the oscillator arrangement shown in Fig. 3 could be used in this instance.

At the substation S, the centre point of the line side of the isolation transformer 22 is taken off to the primary of a second transformer 23, grounded at its other terminal. The secondary of transformer 23 includes dial interrupter (break) springs 24 and switch-hook make springs 25. The secondary of 22 includes the sub-set.

The oscillator is active when the external impedance is high, that is to say, when the phantom-earth impedance at E is high, and this will be true under normal rest conditions at S since the secondary of transformer 23 will then be open-circuited at 25, causing the primary to present a high series reactance to earth.

When the handset is raised from the switch-hook contacts 25 close, short-circuiting the secondary of 23, the impedance of the phantom circuit goes low, and oscillations cease (causing contact 2 at E to close the loop to the automatic equipment).

Whenever the dial springs open during dialling, the short circuit is removed and the oscillator functions.

The system could equally well be arranged to function in the reverse manner, i. e. to oscillate on short circuits, by suitable re-arrangement of the oscillator control circuit.

Also, the arrangement described whereby signalling tone is absent from the line during conversion could equally well be varied, if required, by arranging matters so that tone was normally on the line during conversation.

Figure 6:
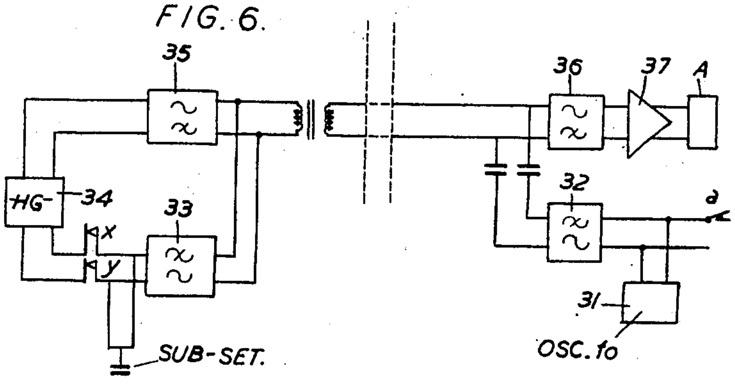
Fig. 6 shows a direct signalling arrangement from oscillator as source, to relay as receiver, based on the separate channel arrangement of Fig. 4.

Fig. 6 illustrates in block form a slighly different arrangement which can be applied particularly to the separate channel signalling arrangements of Figs. 4 and 5, being shown or only the high- and low-pass filter arrangement of Fig. 4.

In this arrangement, the oscillator 31 feeds the line as before via a low-pass filter 32 and is received in the low frequency branch at the sub-station via low-pass filter 33. After suitable frequency multiplication in harmonic generator 34, a suitable higher frequency is returned to line via high-pass filter 35, filters 33 and 35 being complementary, or at any rate, not overlapping, and this higher frequency is separated out at the exchange end in high-pass filter 36 and applied to a detector which includes relay A, either direct or via an amplifier 37.

The impedance is modulated at the sub-station by dial and switch-hook springs $x$ and $y$, and as before, the impedance of the line as seen by the detector (or amplifier) through filter 36 is varied by the dialling process and interpreted by the relay accordingly.

For a simple transmission line arrangement according to Fig. 2 or 3, the oscillator output would be applied direct to the detector and relay, and be bridged by the line, whereby short-circuits at the far (subscriber's) end of the line would be required to have a significant effect at the detector. Such an arrangement is clearly limited to very short lines to be effective.

Since the signalling current is alternating, and in certain embodiments may have a comparatively high frequency and a low level, interruptions of it will not produce dangerous sparks. Surges from the oscillator to the line are of small magnitude and can be made negligible by suitable choice of $C_3$ and $T_1$ (Fig. 2). Any surges from the exchange automatic equipment which might be excessive could be blocked by the use of suitable additional components. For example, a high-pass filter could be introduced between the $L_2$—$C_2$ combination and $T_2$. This could be switched out of circuit by the 17 c. p. s. ringing current to give the latter free passage, or a ringing current of higher frequency could be employed.

The system, therefore appears to have application in mines and other locations where explosive atmospheres present signalling difficulties.

While the principles of the invention have been described above in connection with specific embodiments, and particular modifications thereof, it is to be clearly understood that this description is made only by way of example and not as a limitation on the scope of the invention.

What we claim is:

1. An alternating current signalling system for signalling over a transmission line from a station A to a station B in which the said station B comprises an oscillator connected to said transmission line, the transmission line being coupled in the positive feedback path of said oscillator, and said station A comprising means for modifying the impedance of said feedback path for signalling purposes.

2. The system according to claim 1, and further comprising a signalling relay coupled to said oscillator and operable in response to the operation of said oscillator, means at station A for changing the impedance of said transmission line from a first value to a second value and vice versa, said oscillator to operate only when the impedance of said transmission line is at one of said values, whereby said relay is rendered operative during such period.

3. A system as claimed in claim 2 and in which the said impedance changing means at station A comprises a mechanical impulse generator, a reactive circuit resonant at the oscillator frequency and coupled to the transmission line at said station A, and means including impulse generating springs on said impulse generator for changing the impedance of said resonant circuit.

4. A system as claimed in claim 2 and in which said impedance changing means at station A comprises a mechanical impulse generator, a reactive circuit resonant at the oscillator frequency to provide a low impedance loop at the station A, means including impulse generating springs on said impulse generator to interrupt periodically said loop including the reactive circuit.

5. A system as claimed in claim 4 and in which said impulse generator comprises off-normal make-springs arranged to short-circuit said resonant circuit during signalling, and further comprising a corresponding resonant circuit in the transmission line loop at station B, a short-circuiting make-contact therefor controlled by the signal responding relay at said station B, and means for maintaining said make-contact operated for the duration of the signalling operation.

6. A system as claimed in claim 1 and in which said transmission line comprises a plurality of paths for speech and signalling.

7. A system as claimed in claim 6 and comprising a separate path for signalling current as a phantom circuit with earth return over the conductors of the speech transmission path.

8. A system as claimed in claim 6 and further comprising wave filters for dividing said transmission line into channels each capable of transmitting a predetermined range of frequencies, but a different range for each channel, frequency-changing means at the station A, whereby signalling current beting transmitted from said station B over one of said channels to said station A, is passed to said frequency-changing means, and means returning said signalling current at a different frequency over another of said channels to said station B under control of said impedance changing means.

9. A system as claimed in claim 8 and including means for applying the returned frequency to said oscillator for controlling the generation of signalling current.

10. A system as claimed in claim 8, and further comprising a signal channel outgoing from said station B comprising low-pass filters, means including said frequency-changing means at said station A for producing the third harmonic of signalling current received from station B, signalling means at said station A for interrupting the output of third harmonic current in accordance with a signalling code, a channel comprising high-pass filters for returning said interrupted third harmonic currents to said station B, means at station B for injecting the returned third harmonic currents into said oscillator to control its output and frequency and to maintain it in oscillation, and shock-excitation means at station A for producing a surge of current at third harmonic frequency for restarting the oscillator at station B after it has ceased oscillating consequent upon the interruptions of third harmonic current by the said signalling means at station A.

References Cited in the file of this patent

UNITED STATES PATENTS

| Number | Name | Date |
|---|---|---|
| 1,550,658 | Affel | Aug. 25, 1925 |
| 2,558,214 | Gardere et al. | June 26, 1951 |
| 2,585,019 | Lalande | Feb. 12, 1952 |